United States Patent [19]
Yamaya et al.

[11] Patent Number: 4,728,520
[45] Date of Patent: Mar. 1, 1988

[54] PROCESS OF PREPARING INSTANT NOODLES

[75] Inventors: Tazuo Yamaya, Moriyama; Ryutaro Kubo; Masahiro Yamazaki, both of Ohtsu, all of Japan

[73] Assignee: Nissin Food Products Co., Ltd., Osaka, Japan

[21] Appl. No.: 821,264

[22] Filed: Jan. 22, 1986

[30] Foreign Application Priority Data

Jan. 25, 1985 [JP] Japan .................................. 60-13228

[51] Int. Cl.$^4$ ................................................. A23L 1/16
[52] U.S. Cl. ..................................... 426/94; 426/289; 426/557; 426/451
[58] Field of Search .................... 426/89, 94, 103, 289, 426/290, 557, 451, 512

[56] References Cited

U.S. PATENT DOCUMENTS 4,098,906  7/1978  Hisaki et al. ........................ 426/557

FOREIGN PATENT DOCUMENTS 50-10478   4/1975  Japan .
50-46782   5/1975  Japan .
54-84375   6/1979  Japan .
56-31972   7/1981  Japan .
57-58958  12/1982  Japan .

Primary Examiner—Raymond N. Jones
Assistant Examiner—Marianne M. Cintins
Attorney, Agent, or Firm—Marshall, O'Toole, Gerstein, Murray & Bicknell

[57] ABSTRACT

This disclosure relates to a process of preparing an instant noodle food product. A brick of dried noodles, and a mixture in powder or granular form of seasonings, spices, flavors, a hygroscopic caking component, a thermal caking component or an edible oil in the solid state at the normal temperature below the melting point of 100° C., are placed on the brick. The mixture is fixed on the brick of noodles by moistening and drying or by heating and cooling.

6 Claims, No Drawings

PROCESS OF PREPARING INSTANT NOODLES

FIELD AND BACKGROUND OF THE INVENTION

The present invention relates to a process for preparing dried instant noodles and the like, including an integrated brick of noodles with seasonings, which may be readily rehydrated to the original state and prepared to be served merely by adding hot water.

Dried instant noodles and the like have been prepared in the past in the shape of a brick of dried noodles wherein the noodles are first prepared by kneading, rolling and slitting the raw dough material; the dough is then steamed after being cut, molded and dried such as by frying or by hot air. Further, in the past a brick of dried noodles has been prepared by processing the noodles through the drying step as described above after a seasoning step wherein strings of noodles are soaked in or are sprayed with a seasoning liquid after being steamed.

Since the prior art instant noodles of the type accompanied by separate soup is provided with packages containing seasonings, spices, flavors or the like, in addition to a brick of dried noodles, each of the packages has to be opened prior to cooking, thus making the cooking inconvenient. Also, in the type of cooked dried noodles having a concave containing portion (e.g. "Japanese Utility Model Publication No. Sho.50-10478"), although the packages containing the soup, spices and so on are intended to be carried in the containing portion to prevent damage to the packages by the strings of noodles, it is still inconvenient to cook. On the other hand, when soup, spices, other additional visual ingredients and the like are not contained in packages, they tend to disperse, spill and scatter during the packing and transportation, which causes a deterioration of the flavor and the uniformity of products, including decoloring of the ingredients and so on, thus greatly degrading the product value. A brick of noodles having a hole through the center thereof is also well known (e.g. "Japanese Utility Model Provisional Publication No. Sho.50-46782", "Japanese Utility Model Publication No. Sho.56-31972"), but even in such a brick of noodles, the dispersion or spilling of the powdery or granular seasonings and so on cannot be prevented if they are not packaged. Moreover, when packing for commercial production, it is extremely difficult in practice to carry out both the packaging and the filling of the seasonings, additional visual ingredients and so on, properly and without omission, thus resulting in a relatively complicated process and causing difficult problems of working efficiency and productivity.

On the other hand in case of the conventional seasoned dried noodles, since the whole brick of noodles is fried after being seasoned, the effects of the seasonings and the spices will be reduced or the taste may be changed, and the range of seasonings has limited variety. In the meantime, in the case of seasoning a brick of noodles by soaking it into or spraying it with the seasoned liquid after it has been dried, there may be an increase in the moisture, and sufficient seasoning may be obstructed by the need to control the moisture content level. In any case it is difficult to produce good results.

For solving these disadvantages of the instant noodles of prior art and the like as described above, there have been filed "Japanese Utility Model Application Nos. Sho.52-158430 and Sho.53-20965 (Japanese Utility Model Publication No. Sho.57-58958). In the latter case there is disclosed a measure in which the seasonings, spices and other additional visual ingredients are placed and fixed to the brick of noodles together with a sticking and fixing medium which had been fluidized in advance. However, in the latter Utility Model Application, with the fluidized medium being kept in a gel or solid state, it appears to be somewhat inadequate at this time when more rapid solubility is required for reverting it to the original state.

It will be apparent that until the present invention, a solution has been awaited for the described problems such as the complicated cooking process when the noodles and soup are provided separately, the limitation in the range of seasoning and the inadaptability to various tastes of the preseasoned instant noodles, the spilling and scattering of seasonings, the deterioration in merchandising value of the product and decoloring in the case of unpackaged and simply attached seasonings, additional visual ingredients and so on, and the insufficient solubility in rehydrating to the original state when placing and fixing the sticking and fixing medium of polysaccharides onto the brick of noodles after being fluidized in advance.

It is therefore a general object of the present invention to provide a process of preparing instant noodles, whereby the various problems as described above can be solved systematically, wherein the flavor and color tone of additional visual ingredients are well preserved, the dispersion, scattering and damage of additional visual ingredients during the packing, transportation and so on can be prevented, and when serving, the restoration to the original state can be made promptly by merely pouring hot water or ordinary water.

SUMMARY OF THE INVENTION

In accordance with the present invention by repetition of moistening and heating processes respectively after adding the powdery or granular seasonings, spices, flavors or the like containing a hygroscopic caking component, thermal caking component or edible oil, in the solid state at the normal temperature below the melting point of 100° C., it is possible to stick and fix the seasonings, etc. on the brick of noodles very simply and in short time.

That is to say, the present invention relates to a process of preparing instant noodles (hereinafter referred to as the first aspect of the invention), characterized by adding powdery or granular seasonings, spices, flavors and the like containing a hygroscopic caking component on a brick of dried noodles which has been prepared by a known process, sticking and fixing the seasonings, spices, flavors and the like to the brick of noodles after moistening them and then suitably drying them if necessary. The present invention further relates to another process of preparing the instant noodle (hereinafter referred to as the second aspect of the invention), characterized by adding the powdery or granular seasonings, spices, flavors and the like containing either or both of a thermal caking component or edible oil in the solid state at the normal temperature below the melting point of 100° C., on the brick of dried noodles prepared by a known process, and sticking and fixing the seasonings, spices, flavors or the like onto the brick of noodles after heating them.

DETAILED DESCRIPTION

A brick of dried noodles utilized in the present invention is prepared by an ordinary prior art method. For example, it may be processed through various drying steps such as oil frying, hot air, vacuum refrigeration, microwave heating and so on. In addition, dipping in a seasoned liquid is resorted to for dried noodles prepared by the conventional processes.

In the first inventive aspect as described above, it is necessary to contain the hygroscopic caking component in the seasonings, spices, flavors or the like. As the hygroscopic caking component, there are available the sugar-alcohol group (e.g. sorbitol, maltitol, etc.), sugar group (e.g. glucose, sucrose, fructose, maltose, lactose, etc.), protein (e.g. lactalbumin, albumin, egg white, gelatin, etc.), hydrolyzed protein (e.g. hydrolyzed vegetable and animal proteins and gelatin, etc.), gelatinized starch group (e.g. gelatinized potato starch, gelatinized corn starch, gelatinized waxy corn starch, etc.), hydrolyzed group of starch (e.g. dextrin, etc.), polysaccharides (agar, guar gum, xanthan gum, pullulan, etc.), amino acid group (e.g. sodium glutamate, glycine, alanine, aspartic acid, etc.), nucleic acid group (e.g. 5'-inosinic acid, 5'-guanylic acid and their salts, etc.), organic acid group (e.g. succinic acid, tartaric acid and their salts, etc.), which may be used independently or in combination.

In a powdered soup or the like (moisture content of about 0.5–15%) provided with the instant noodles, either of the aforementioned hygroscopic caking components is normally contained as the base compound component of the seasonings, spices, flavors or the like. In this case, the hygroscopic caking component is not required to be included particularly, however, the hygroscopic caking component in the base compound may be added also and the other hygroscopic caking component may be newly added and included. The seasonings, spices, flavors or the like containing the hygroscopic caking component mentioned above are kept in the powdery or granular state by the conventional pulverizing or granulating methods used when they are added onto the brick of dried noodles. The seasonings, spices, flavors or the like may be suitably kept in the granular state, taking into consideration the various advantages thereof, such as the simple and accurate weighing of them as well as the easy operation for adding the seasonings and so on to the brick of noodles. A dispersion and loss of the seasonings and so on by passing through the brick of noodles after their addition may be substantially prevented, the retainment in the brick of noodles and the control thereof may be easily accomplished, and the seasonings and so on will be readily fixed on the brick of noodles and easily soluble when rehydrating to the original state.

Meanwhile, the seasonings, spices, flavors or the like mentioned above are added onto the brick of dried noodles after being weighed in a fixed amount respectively by a soup filling apparatus and the like. It is desirable to treat the brick of dried noodles immediately after the drying processing or within a short lapse of time. While the brick of noodles may be conveyed to the following moistening process with said seasonings and so on being dropped spontaneously and maintained thereon for preventing scattering and thus loss during the movement, it is also possible to keep the seasonings and so on guided to the moistening process after being dispersed and retained between the strings of the brick of noodles in order to facilitate their fixing onto the brick of noodles and increase the rehydration process of product.

To better disperse the seasonings and so on to all parts between the strings of noodles, the following different methods may be employed: a method of applying a controlled periodic vibratrion by a vibrator or the like to the brick of noodles after adding the fixed amount of seasonings and so on mentioned above thereto; a method of dropping the seasonings and so on mentioned above between the strings of noodles by providing an air pressure from compressed air or the like locally from the feeding direction; or a method of dispersing the seasonings and so on between the strings of noodle by sucking air from the opposite direction of the source of the seasonings and so on mentioned above; or a method of dispersing the seasonings within the brick of noodles by spraying them by the compressed air after weighing out a fixed amount, which accomplishes the feeding and dispersion at one stroke. Meanwhile, each method mentioned above may be suitably used in combination with one of the other methods, depending on the extent of dispersion desired. Furthermore, in order to facilitate the dispersion of the added seasonings and so on mentioned above between the strings of noodles, to enable a good retainment therebetween and to prevent them from passing and leaking therethrough, it is desirable to use a brick of dried noodles having a coarser density in the upper portion and a higher density in the lower portion. It is particularly suitable if the seasonings and so on mentioned above are in the granular form, because they tend to be retained in the lower strings of noodles where the density is higher and the extent of dispersion may be controlled easily.

On the other hand, it is possible to use a brick of dried noodles, the density of the noodles in the upper portion being high enough to retain the seasonings and so on mentioned above, while the density in the lower portion being relatively coarse. In this case, a recess is formed on the surface of the brick of noodles in advance and the fixed amount of seasonings and so on mentioned above are fed to the recess, then guided to the following moistening process without being dispersed. Since the seasonings and so on are retained on the dense strings of noodles in the upper portion and held within the recess, the leaking and scattering may be prevented. It is advantageous that the additional visual ingredients may be also stuffed into the recess together with the seasonings and so on, and the relatively large additional visual ingredients and the like may be fixed onto the brick of noodles together with the seasonings and so on by processing them through the following moistening process.

Furthermore, a recess part can be formed in a brick of noodles having approximately uniform density of noodle strings, or in a sparse side of a brick of noodles having a variety of densities of noodle strings. It is, of course, possible to contain, as mentioned above, the seasonings, visual ingredients and so on in such a recess part.

In the manner as described above, the seasonings, spices, flavors and so on containing the hygroscopic caking components are added on the brick of dried noodles and dispersed between the strings of noodles, and the brick is further processed within a moistening apparatus. As for moistening methods, spraying water or contacting with steam may be used. As a variation of the former, an aqueous solution formed with a liquid which is safe from a food sanitation point of view and having a high volatility (such as alcohol) may be used for spraying. Meanwhile, in case of contacting with steam, a commonly used steam generator or an evaporator may be utilized, and the vapor of a liquid having a high volatility (such as alcohol) may be mixed with the steam from such an apparatus.

Regarding the moistening method of contacting with steam, the processing should be carried out in an atmosphere of about 50–100% relative humidity, at a temperature of approximately 50–200° C. for about 1 sec. to about 10 min. In the case of spraying with water, the water (or mixed aqueous solution) having a temperature above the normal room temperature is recommended when spraying, but the temperature is not limited to a temperature above the room temperature. In this moistening process, the higher the relative humidity the better the sticking and fixing of the seasonings, spices, flavors and so on mentioned above to the brick of noodles; the resulting moisture content after the processing of the seasonings and so on reaching the range of about 1–18%. In this connection, as the processing temperature becomes higher, better sticking and fixing effect can be obtained, and therefore the processing time may be shortened, while an excessively high processing temperature is not recommendable because it may cause changes in the taste and the dispersion of flavor. Furthermore, a long processing time is also unwelcome because it tends to cause the hygroscopic action of sticking and fixing the seasonings and so on on the brick of noodles while moistening the brick of noodles. Thus, the moistening conditions, the relative humidity, the processing temperature and time may be suitably adjusted within the limits mentioned above, depending upon the content of hygroscopic caking component in said seasonings, spices, flavors or the like. In the usual powdered soup with the instant noodles, for example, in the method of contacting with steam, preferably the processing conditions of about 80–100% relative humidity, approximately 90–110° C. and about 3–60 seconds may be applied. When the states of sticking and fixing are not sufficient, it is to be understood that it may be strengthened by increasing the additional hygroscopic caking component mentioned above.

For example, when sticking and fixing the additional visual ingredients onto the brick of noodles together with the seasonings and so on mentioned above, the fixing strength must be increased because the visual ingredients are in brick form and heavier than the powdered soup. In such a case, in a conventional process, the additional visual ingredients have been stuck on and fixed onto the brick of noodles in the gel or solid states by cooling and so on, after being mixed with a fluidized sticking and fixing medium such as the polysaccharides, natural gum and so on, before or after placing on the brick of noodles (see Japanese Utility Model Publication No. Sho.57-58958). On the contrary, in accordance with the present invention, the seasonings, spices, flavors or the like containing the hygroscopic caking component are prepared in the powdery or granular state and added onto the brick of noodles, together with the additional visual ingredients which are then moistened and rapidly stuck and fixed onto the brick of noodles taking advantages of the stickiness due to the moisture absorption of the hygroscopic caking component. At this time, depending upon the kinds of additional visual ingredients and so on, the kinds and contents of the hygroscopic caking component will be suitably selected and adjusted in quantity to strengthen the fixing force.

Because these additional visual ingredients are moisture absorbent in nature, it is essentially not desirable to keep the product in a highly humid environment for a long time from the viewpoints of preservation and rehydration with the moisture content increasing. Under the present invention, however, the deposition, sticking and fixing of the seasonings and so on mentioned above are completed in an extremely short time of only a few seconds to several tens of seconds, and the moistening process is carried out far more rapidly than the hygroscopic speed of the additional visual ingredients, and the increase of moisture content thereof is less than 1–3% and there is hardly any deterioration of the preservation and rehydration characteristics. Moreover, the increase of moisture contents of the seasonings and so on stuck and fixed on the block, and the brick of noodles after the moistening processing are both less than about 3%; thus the preservation thereof will be hardly influenced. When the absolute moisture content after the moistening processing is high, while it is possible to dry again, the drying processing is by far shorter than drying the paste in the conventional process in this case, so that a deterioration of flavor, dispersion of aroma and is not a problem. Moreover, the sticking and fixing force can be strengthened with a short processing time set a before by increasing the content of the hygroscopic caking component; thus relatively large pieces of additional visual ingredients can be stuck and fixed to the block.

In this manner as described above, the seasonings, spices, flavors or the like containing the hygroscopic caking component can be stuck and fixed onto the brick of noodles by the moistening processing, and the instant noodles are prepared with additional visual ingredient being stuck and fixed together in accordance with the result desired. In the prior art, the instant noodles are packed and prepared as the product by the ordinary method after being cooled or dried for a short time when necessary. The instant noodles prepared in accordance with the present invention are not limited to the packed form of the product, but may be also prepared as instant noodles by being suitably formed into a shape of an inverse flat-head truncated cone or the like, using a brick of noodles provided with a recess portion, if necessary, and storing it in a container of the type commonly used as a disposable cooking utensil.

The second aspect of the present invention relates to a process of preparing instant noodles, characterized by adding the powdery or granular seasonings, spices, flavors or the like containing either or both of a thermal caking component or an edible oil, in the solid state at the normal temperature below the melting point of 100° C., onto a brick of dried noodles prepared by the ordinary method, heating the brick of noodles, and sticking and fixing the seasonings, spices, flavors or the like thereto.

As for the thermal caking components, dextrin, sugars (glucose, sucrose, fructose, maltose, etc.), gelatin and so on may be used. Meanwhile, as for the edible oils in the solid state (or semi-solid state) at the normal temperature below the melting point of 100° C., hydrogenated vegetable oils such as soybean oil, rapeseed oil, palm oil, rice oil, corn oil, safflower oil, etc., shortening oil, lard and so on may be used. As the base compound component of the seasonings, spices, flavors or the like, although the seasonings and the like may be used as they are when the thermal caking component or the edible oil mentioned above are combined, the thermal caking component may be further added to strengthen the sticking force. In this second aspect, each component described above may be used singly or in a combination of several of them.

The seasonings, spices, flavors or the like containing the thermal caking component or the edible oil in the solid state at the normal temperature below the melting point of 100° C., are added to the brick of dried noodles after being pulverized or granulated, preferably pelletized in granules, for the same reason as in the first aspect, and weighed to a fixed amount by the weighing apparatus according to the conventional method. Although the brick of dried noodles may be guided to the following heating process with the seasonings, etc. only being added, or, when desired, being provided with additional visual ingredients, it may be also sent to the next heating process after dispersing the powdery or granular seasonings and so on between the strings of the noodles within the brick, the same as in the first inventive aspect. The processing effect the same as in the first inventive aspect is obtainable by dispersing the powdery or granular seasonings, etc. mentioned above, which may be fixed simultaneously on the strings of noodles, as the thermal caking component or the edible oil will be caked or dissolved extremely rapidly and uniformly in heating and solidifying on the surface of the strings of noodle immediately by the cooling after the heating. Particularly, in case of the granules, as the results of rapid melting (dissolution) and solidification, since the granules plus strings of noodles or the granules plus granules are coupled together by the bridging structures in the porous state to fix the seasonings and so on mentioned above, in cooperation with the dispersion within the brick of noodles, it is very effective in improving the rehydrating property. The processing effect caused by such porous state may be obtained similarly in the first aspect. The brick of dried noodles with the seasonings and so on mentioned above added, or the additional visual ingredients if necessary, is heated for a short time. As for the heating methods, hot air, an infrared ray (incl. far infrared ray) or a microwave heating may be used independently of each other or in a suitable combination. The heating conditions may be suitably adjusted in accordance with the kinds and contents of the thermal caking component or the edible oil mentioned above, the size of granules and the heating methods; for example, when heating the granular seasonings (10–40 meshes) containing about 10% of dextrin by the infrared ray, the seasonings can be fixed by cooling immediately after heating at the temperature of about 80–160° C. for about 10–180 seconds.

The dried noodles fixed with the seasonings and so on by heating may be packed by the ordinary methods for producing the final instant noodle product. It is, of course, possible to have the instant noodles supplied in a container which may concurrently be used as a cooking utensil.

In an instant noodle product prepared in accordance with the second aspect, the granules are stuck together and fixed by forming bridges, making the sticking of the granules to the strings of noodles excellent and at the same time improving the rehydrating property a great deal due to the porosity thereof. This is different from the conventional process wherein the pasty fluidized seasonings, etc. are dropped and stuck onto a brick of noodles and are fixed thereto by cooling.

Furthermore, in accordance with the present invention, for the embodiment of the first aspect, it is not only possible for the seasonings, spices, flavors or the like to contain the hygroscopic caking component but also it can use one or more kinds concurrently of thermal caking components or the edible oils in the solid state at the normal temperature below the melting point of 100° C., as mentioned above. In this case, the method of sticking and fixing the seasonings, spices, flavors or the like containing the various components mentioned above onto the brick of noodles may be effected by forming both the moistening and heating process steps by the wet heating process. The wet heating process may be carried out by the steam heating process using the ordinary steaming apparatus, for example; the sticking and fixing can be completed by processing at the temperature of about 90–120° C. for about 2 to about 60 seconds, cooling immediately thereafter, and packaging to make the instant noodle products. Although the processing by high temperature steam is the most simple and convenient method, other wet heating processes such as contacting with steam and water spraying in combination with the microwave heating and the infrared ray heating are also possible.

It will be apparent from the foregoing that the present invention relates to a process of preparing an instant noodle product, in which the seasonings, spices, flavors or the like containing hygroscopic caking components are used. The seasonings, etc. are stuck and fixed onto and integrated with a brick of dried noodles within an extremely short time, and, when desired, additional visual ingredients may be integrated also by the hygroscopic processing, thereby taking advantage of the hygroscopic caking action thereof. The present invention further relates to a process of preparing an instant noodle product, in which, when using the seasonings, spices, flavors or the like containing an edible oil which is in the solid state at the normal temperature below the melting point of 100° C., the seasonings, etc. are similarly stuck and fixed on the brick within an extremely short time and integrated therewith by a heating process, taking advantage of the heat dissolving and cooling caking actions thereof.

The seasonings, spices, flavors or the like containing the sticking and fixing medium such as the hygroscopic caking component, the thermal caking component, the edible oil which is in the solid state at the normal temperature below the melting point of 100° C., are pulverized or granulated into granules and then added onto the brick of dried noodles in that form.

As a result, the following effects are obtained. By taking the form of powder or granules, the advantages are obtained in ease of weighing and additional feeding in operations, for storing and handling the powder and granules, and also in keeping the quality uniform. The merit of these advantages is that the high productivity in the industrial mass production can be assured. Since it is possible to feed additionally in the form of powder or granules, it facilitates the dispersion between the strings of noodles and the retainment within the brick of noodles. The sticking and fixing processings, such as moistening (incl. wet heating) and heating can therefore be readily performed on each particle, resulting in reducing the processing time greatly. Shortening the moistening processing time effectively restrains the increase of moisture content in the brick of noodles and the seasonings, and in the heating processing, the excessive heating of the dried brick of noodles and the seasonings can be precluded thereby, which are extremely effective in preserving and improving the product quality. In the present invention, the processing time for the sticking and fixing step can be effected only in a matter of a few seconds to several tens of seconds, and in the moistening processing, the increase in the moisture content is less than about 2% or not exceeding 3% at the maximum; thus the shelf life and the rehydrating property (incl. a solubility of seasonings and so on) will be hardly deteriorated. In addition, since the processing time is short, the scattering or changing of the flavors of the seasonings and so on by the processing can be practically avoided (refer to Tables 1 and 2).

Furthermore, since the additional feeding is made in the form of powder or granules, the sticking and fixing step takes place around the contacting points thereof by the moistening and heating steps, as the result of which seasonings and so on mentioned above which are stuck and fixed on the brick of noodles tend to become porous by keeping gaps between the particles, and the solubility in rehydration will be considerably increased. Besides, the solubility can be increased and promoted with multiplied effectiveness by granulating or kept dispersing within the brick of noodles, and diffused very well into the liquid in rehydration.

In the conventional process, the sticking and fixing medium such as the edible oil in the solid state at the normal temperature, polysaccharides, natural gum and so on are fluidized in the pastry state together with the seasonings and so on, and are dropped onto the brick of noodles and fixed in the form of cake or gel by cooling or the like, which requires a relatively long fixing time and results in a low productivity; since the seasonings are fixed in the form of a lump in the solid state, the difficulty is encountered in the solubility, because the dissolution has to take place gradually from the surface portion in rehydration. Therefore, a time lag occurs between the rehydration of noodles and the dissolution and diffusion of the seasonings, making it difficult to determine the optimum serving time. In the present invention, with the additional feeding to be effected in the form of powder or granules and with the fixing time being short, problems involved in the conventional process as described above can be totally avoided and the rapid solubility is assured, thus enabling a process of preparing instant noodles having a good harmony between the rehydration of noodles and the dissolution and diffusion of the seasonings (refer to Table 1).

At the same time, by adjusting the conditions of the fixing process step, that is by disposing it in an extremely short wet heating process at the maximum, humidity, only the uppermost surface portion of the seasonings and so on mentioned above being added is formed as the sticking and fixing film, and the inner portion may be kept in the powdery or granular state; thus by this embodiment, the delay of the dissolving time caused by dissolving action starting from the surface portion of the solid seasonings, may be solved also.

As described above, according to the present invention, because various seasonings, spices, flavors of the like can be suitably stuck and fixed onto and integrated with the brick of dried noodles, the limited range of application of the seasonings in the conventional process may be solved, and not only the flavor of curry seasoning but also other various seasonings such as the soybean paste (miso paste), soy sauce and so on are possible to apply. Meanwhile, according to the present invention, the instant noodle product in the form of a brick of noodles integrated with the seasonings, and when desired, any additional visual ingredients can be prepared, so that the complexity of cooking (as in the case of a separate soup accompanied type) can be eliminated. Since the seasonings and so on are retained and fixed between the strings of noodles in the brick of noodles, the damage and spilling of the seasoning by scattering can be prevented; thus the instant noodle product having a good rehydrating property and solubility with well preserved flavor and good taste may be prepared. Furthermore, since the instant noodle product in accordance with the present invention can be packed in one package, dispensing with the previous separate packages, the production process can be simplified accordingly and made considerably more economical in cost. When a recess part is formed on the brick of noodle, it is all the more advantageous with the seasoning, visual ingredients and so on concentrated to stay in the recess part, assuring that they are not going to make contact with or being abraded by the internal surface of the package and thus be ruined thereby.

EXAMPLE 1

16 g of salt, 1.2 g of potassium carbonate, 0.8 g of sodium carbonate, and 1 g of guar gum are dissolved in 330 ml of water and 1,000 g of wheat flour are added to the resultant kneading water and are mixed for 15 minutes. The resultant dough is rolled seven times to provide a sheet of noodle dough having a thickness of 0.75 mm. The obtained sheet of noodle dough is sheared by a roll cutter to provide strings of the noodles having a width of 1.5 mm. After the obtained strings of noodles are steamed in a tunnel steamer (under the pressure of about 1.0 kg/cm$^2$ for 2 minutes), the strings are dipped in a seasoning liquid (described hereafter) for about 5-6 seconds and the resultant seasoned noodles are sheared to provide strings of noodles having about 25 cm in length. 130 g of the obtained strings of noodles are molded in a cylindrical retainer (120 mm $\phi \times$ 30 mm depth) and fried in palm oil at temperature 145° C. for about from two minutes and 15 seconds to two minutes and 40 seconds to provide instant fried noodles.

| The Seasoning Liquid Includes: | |
|---|---|
| Salt | 100 g; |
| Monosodium Glutamate | 20 g; |
| Chicken Extract Paste | 15 g; and |
| Soy Sauce | 60 ml |

(The above listed ingredients are dissolved in water to provide 1 l of the seasoning liquid).

Immediately after the frying step, the mixture of 6 g. of powdered soup (soy sauce seasoned) having the formulation listed hereinafter, and 0.2 g. of dried green onions (visual ingredient) are placed on the dried noodles (for about 82 g/unit of noodles). The noodles and mixture are moistened by guiding them through a tunnel-type steamer and formed into a loaf or brick of instant noodles. The quantity of steam was adjusted by controlling the steaming pressure at 0.1-0.5 kg/cm$^2$, and the degrees or amount of sticking and fixing of the powdered soup onto the brick of noodles was examined at different steaming times. As the result, all test samples were fixed well on the brick of noodles. The dried green onion was also fixed well onto the brick of noodles together with the soup. The degrees of increase in the moisture content and the fixing, and the solubility of soup, for the instant noodle product at each steaming condition are shown in Table 1. Meanwhile, the steaming condition in accordance with the present invention was at the relative humidity of about 100% and the temperature was at about 95-99° C. When the instant noodle product prepared in the manner described above was placed in a bowl and rehydrated by pouring hot water therein (at approximately boiling temperature and enough to cover the noodle product), it rehydrated to the serving state in about 3 minutes, and the soup was also well dissolved and a bowl of Oriental noodles having the soy sauce taste diffused sufficiently in the soup was obtained.

| Soup Compound Was As Follows | |
|---|---|
| Monosodium Glutamate | 8 parts |
| Sugar-alcohols | 20 parts |
| Powdered Soy Sauce | 17 parts |
| Powdered Bonito Essence | 15 parts |
| Powdered Dried Bonito | 9 parts |
| Powdered Tangle Essence | 2 parts |
| Spices | 2 parts |

EXAMPLE 2

A brick of fried noodles as described in Example 1 and 4.5 g. of curry granules (about 10-40 mesh) granulated by the ordinary method for a soup compound was added. Hydrogenated lard was contained in the curry granules as the edible oil in the solid state at the normal room temperature, the lard forming about 25% by weight of the granules. The brick of fried noodles having placed the curry granules on the top was vibrated by a vibrator, and the curry granules were shaken into the brick and dispersed. Then, the curry granules were melted and stuck onto the noodles of the brick by heating the brick with an infrared ray lamp for about 60 seconds, and then fixed by cooling immediately by blowing cold air over the brick, to prepare the curry taste instant noodles.

| Soup Compound For the Noodles of Example 2 | |
|---|---|
| Hydrogenated lard | 21 parts |
| Curry Powder | 15 parts |
| Powdered Meat Essence | 13 parts |
| Vegetable Powder | 5 parts |
| Monosodium Glutamate | 10 parts |
| Powdered Milk | 8 parts |
| Sugars | 5 parts |
| Salt | 3 parts |
| Spices | 3 parts |
| Gelatin | 1 part |

EXAMPLE 3

The fried noodles (about 82 g. for each brick) was prepared by frying and molding into a brick by a conventional method so as to obtain a relatively dense density in the upper portion of the brick and a relatively coarse density in the lower part thereof, after kneading, rolling, slitting, steaming, shearing and molding in accordance with the ordinary conventional method. After frying, 7.5 g. of granular bean paste taste soup (miso soup) granulated by the ordinary method in the following listed compound, was weighed and added immediately onto the top of the brick of noodles, whose coarse surface was facing upwardly. The brick was then shaken by a vibrator and the granular soup on top of the brick was dispersed in all parts within the brick of noodles. The brick of noodles was then guided through a tunnel-type steamer and processed by wet heating in the steam atmosphere at a steaming pressure of 0.01-0.05 $kg/cm^2$, a relative humidity of about 100% and a temperature of about 95-99° C. for approximately 7-20 seconds. The steaming pressure and time conditions were changed for different bricks, and 10 samples of the instant noodles were prepared at each condition by sticking, fixing and integrating of the granular soup in the brick of noodles. The different moisture contents and the fixing states of the noodles and the soup fixed on the instant noodles and prepared at the various conditions mentioned above, are given in Table 2.

| Soup Compound for Example 3 | |
|---|---|
| Powdered Miso Paste | 60 parts |
| Seasoning Oil | 4 parts |
| Powdered Meat Essence | 3 parts |
| Salt | 3 parts |
| Spices | 2.5 parts |
| Parches Sesame | 3 parts |
| Sugars | 1 part |

TABLE I

Fixing State and Solubility of Soup Added

| Sample | Steaming Pressure ($kg/cm^2$) | Steaming Time (second) | Water Content After Steaming % | Increased Water Contents (%) | Fixing State of Soup | Solubility |
|---|---|---|---|---|---|---|
| Present Invention | | | | | | |
| No. 1 | 0.1 | 10 | 3.78 | 2.22 | △ | ◉ |
| No. 2 | 0.1 | 20 | 3.90 | 2.34 | ◉ | ◉ |
| No. 3 | 0.2 | 20 | 4.01 | 2.45 | ◉ | ◉ |
| No. 4 | 0.5 | 10 | 3.76 | 2.20 | ◉ | ◉ |
| No. 5 | 0.5 | 20 | 4.18 | 2.62 | ◉ | ◉ |
| No. 6 | 0.5 | 30 | 4.49 | 2.93 | ◉ | ◉ |
| Contrast Samples | | | | | ◉ | ◉ |
| No. 11 | — | — | 1.56 | — | XX | ◉ |
| No. 12 | (Dropped and fixed after mixed with fluidized oil) | | | | ○ | △ |
| No. 13 | (Dropped and fixed after mixed with fluidized natural gum) | | | | ○ | X |

TABLE II

INCREASE OF WATER CONTENT OF NOODLES AND FRIED SOUP

| Samples | Moistening Steaming Pressure ($kg/cm^2$) | Steaming Time (sec.) | Water Content After Moistening Noodle (%) | Soup (%) | Increased Water Content Noodle (%) | Soup (%) | Fixing State Of Soup | Solubility |
|---|---|---|---|---|---|---|---|---|
| No. 1 | 0.01 | 7 | 2.79 | 7.18 | 1.05 | 0.50 | △ | ◉ |
| No. 2 | 0.02 | 7 | 2.52 | 7.23 | 0.78 | 0.55 | ○ | ◉ |
| No. 3 | 0.03 | 7 | 2.35 | 7.14 | 0.61 | 0.46 | ○ | ◉ |
| No. 4 | 0.04 | 7 | 2.33 | 7.30 | 0.59 | 0.62 | ◉ | ◉ |
| No. 5 | 0.05 | 7 | 2.42 | 7.84 | 0.68 | 1.16 | ◉ | ◉ |
| No. 6 | 0.01 | 10 | 2.57 | 7.92 | 0.83 | 1.24 | ◉ | ◉ |
| No. 7 | 0.02 | 10 | 2.08 | 7.62 | 0.34 | 0.94 | ◉ | ◉ |
| No. 8 | 0.03 | 10 | 2.44 | 8.50 | 0.70 | 1.82 | ◉ | ◉ |
| No. 9 | 0.01 | 15 | 2.45 | 7.98 | 0.71 | 1.30 | ◉ | ◉ |

TABLE II-continued
INCREASE OF WATER CONTENT OF NOODLES AND FRIED SOUP

| Samples | Moistening Steaming Pressure (kg/cm²) | Moistening Steaming Time (sec.) | Water Content After Moistening Noodle (%) | Water Content After Moistening Soup (%) | Increased Water Content Noodle (%) | Increased Water Content Soup (%) | Fixing State Of Soup | Solubility |
|---|---|---|---|---|---|---|---|---|
| No. 10 | 0.01 | 20 | 2.44 | 8.56 | 0.71 | 1.88 | ◉ | ◉ |
| Contrast Sample | — | — | 1.74 | 6.68 | — | — | XX | ◉ |

Note 1:
1. The contrast sample No. 11 (see Table I) was not processed by steaming processing, but merely added with the powdered soup on the brick of noodles. Therefore, there is no increase of the moisture content due to processing.
2. In the contrast sample No. 12 (Table I), the fluidized powdered soup and hydrogenated lard are dropped onto the brick of noodles and fixed by cooling.
3. In the contrast sample No. 13 (Table I), the fluidized powdered soup and guar gum are dropped onto the brick of noodles and fixed by cooling.

Note 2:
The "solubility of soup" means a dissolved state after three minutes from pouring hot water on the sample.

Note 3:
Evaluations of "fixing state" and "solubility" are as follows:
◉ very good, ○ a little good △ ordinary
X a little poor, XX very poor Note 4:
Notes 2 and 3 also apply to Table 2.

What is claimed is:

1. A process for preparing an instant noodle food product, comprising the steps of forming a brick of dried noodles, adding a powdered or granular mixture of seasonings, spices, flavors and a hydroscopic caking component onto the brick of dried noodles and thereafter sticking and fixing said powdered or granular mixture on said brick of noodles by moistening said noodles and said mixture.

2. The product prepared according to the process of claim 1.

3. A process for preparing an instant noodle food product, comprising the steps of forming a brick of dried noodles, adding a powdered or granular mixture of seasonings, spices, flavors and a thermal caking component onto the brick of dried noodles and thereafter sticking and fixing said powdered or granular mixture onto said brick of noodles by heating and then cooling said noodles and said mixture.

4. The product prepared according to the process of claim 3.

5. A process for preparing an instant noodle food product, comprising the steps of forming a brick of dried noodles, adding a powdered or granular mixture of seasonings, spices, flavors and a solid edible oil having a melting point of less than 100° C., onto said brick of dried noodles and thereafter sticking and fixing said powdered or granular mixture onto said brick of noodles by heating and then cooling said noodles and said mixture.

6. The product prepared according to the method of claim 5.

* * * * *